(12) United States Patent
Luo

(10) Patent No.: US 10,493,828 B2
(45) Date of Patent: Dec. 3, 2019

(54) VENTED WINDSHIELD

(71) Applicant: Zhejiang CFMOTO Power Co., Ltd., Hangzhou, Zhejiang (CN)

(72) Inventor: Longping Luo, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 216 days.

(21) Appl. No.: 15/651,973

(22) Filed: Jul. 17, 2017

(65) Prior Publication Data

US 2018/0244135 A1   Aug. 30, 2018

(30) Foreign Application Priority Data

Feb. 24, 2017   (CN) .................... 2017 2 0175093 U

(51) Int. Cl.
*B60J 1/20* (2006.01)
*B60J 1/02* (2006.01)

(52) U.S. Cl.
CPC .. *B60J 1/20* (2013.01); *B60J 1/02* (2013.01)

(58) Field of Classification Search
CPC ....... B60J 1/02; B60J 10/70; B60J 1/00; B60J 1/06; B60J 1/006; B60J 10/265; B60J 10/30; B60J 1/008; B60J 1/04
USPC ..... 296/84.1, 93, 146.15, 201, 200, 90, 192, 296/96.12, 70, 87; 65/106, 107, 11, 112, 65/244, 60.1, 61
See application file for complete search history.

(56) References Cited

U.S. PATENT DOCUMENTS

| 4,470,341 | A |   | 9/1984 | Hirukawa et al. |
| 4,721,032 | A | * | 1/1988 | Sakamoto ............ B60H 1/0055 454/146 |
| 4,830,423 | A | * | 5/1989 | Nebu ........................ B62J 17/02 296/78.1 |
| 5,009,459 | A | * | 4/1991 | Charles ................. B60S 1/0402 15/250.31 |
| 5,160,827 | A | * | 11/1992 | Parker .................... B60J 1/2011 219/202 |
| 5,709,163 | A | * | 1/1998 | Livingston .............. B63B 19/04 114/211 |
| 5,774,926 | A | * | 7/1998 | Jacoby .................. B60S 1/0486 101/35 |
| 5,797,791 | A |   | 8/1998 | Humphrey et al. |
| 7,464,660 | B2 |   | 12/2008 | Erskine |
| 7,954,443 | B2 |   | 7/2011 | Mason et al. |
| 2012/0247503 | A1 | * | 10/2012 | Strand ........................ B60J 1/00 134/1 |

* cited by examiner

*Primary Examiner* — D Glenn Dayoan
*Assistant Examiner* — Sunsurraye Westbrook
(74) *Attorney, Agent, or Firm* — Shewchuk IP Services, LLC; Jeffrey D. Shewchuk

(57) ABSTRACT

A windshield for a utility or off-road all terrain vehicle includes a plurality of slits through a bottom center of the windshield body. A slide plate with corresponding slits is slidably attached to the windshield body. The slide plate is formed of the same transparent or translucent material as the windshield body, but is not as thick and the windshield body and is not hardened. Fasteners are fixed to the windshield body and extend through slide slots in the slide plate, enabling a throw of the slide plate of at least the width of the slits. A spacer or seal strip is positioned between the windshield body and the slide plate.

20 Claims, 4 Drawing Sheets

VENTED WINDSHIELD

CROSS-REFERENCE TO RELATED U.S. APPLICATION(S)

None.

FIELD OF THE INVENTION

The present invention relates to windshields, and particularly to windshields of all terrain or utility vehicles intended for off road travel.

BACKGROUND OF THE INVENTION

Utility vehicles and all terrain vehicles are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement.

Many all terrain and utility vehicles include a windshield through which the driver and any passenger(s) look forward when travelling. The windshield provides significant safety benefits, such as shielding the driver and any passenger(s) from branches, bugs, and airborne stones or other debris. The windshield assists in driver and passenger comfort, such as keeping the occupants dry and comfortable during rain or snow conditions and keeping the occupants clean when travelling through muddy or dusty conditions. All terrain vehicle cabs with windshields are available both in open configurations, wherein there may be no side windows or rear window, and in closed configurations, where side and rear windows further enclose and protect the occupants. In general however, even in closed configurations, all terrain and utility vehicles still remain relatively simple and provide no air conditioning or other source of forced cool air ventilation. Even if an air heating system is provided to warm the occupants, some occupants desire additional fresh air in the cockpit, as a substantial part of the riding experience involves enjoying outdoor conditions.

BRIEF SUMMARY OF THE INVENTION

The present invention is a vented windshield for a utility or off-road all terrain vehicle. At least one opening, and more preferably a plurality of slits are defined through the windshield body, such as to define a ventilation area which is in a bottom center of the windshield. A slide plate cover is slidably attached to the windshield body, slidable between a closed position in which the slide plate substantially restricts or prevents air from flowing through the windshield and an opened position in which the slide plate allows air flow linearly through the windshield. For instance, the slide plate cover may have a plurality of slits which match the plurality of slits of the windshield body, and a throw of a length corresponding to the width of the slits, such that only a small amount of movement of the slide plate is needed to open or close the vent. The slide plate may be attached to the windshield by a plurality of fasteners extending through the windshield to define slide pegs, with the slide plate having slots receiving the fasteners for sliding movement thereon. While the vented windshield is in the open position in an enclosed cab, air exchange and the corresponding temperature adjustment in the cab can be realized. While the vented windshield is in the open position in an open cab, the air flow entering into through the windshield changes the air flow direction in the cab, minimizing the entry of dust raised on the sides of the vehicle from entering and settling in the cab, thereby improving the driving environment. The vented windshield may also include a seal strip between the windshield body and the slide plate, so as to assist in preventing water from entering the cab through the ventilation area while the slide plate is in the closed position.

Figure 1:
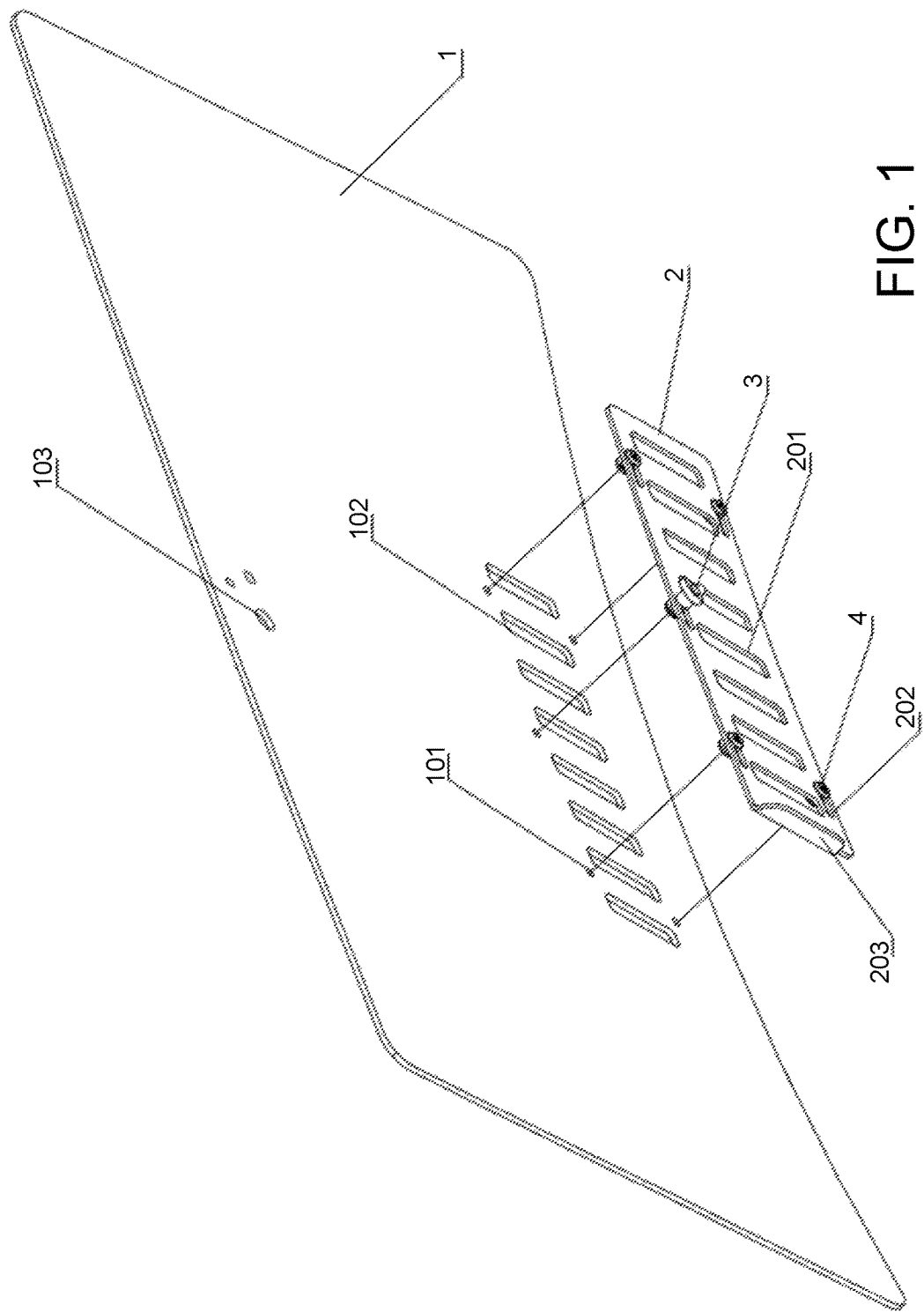
FIG. 1 is an exploded perspective view of a windshield in accordance with a preferred embodiment of the present invention.
Figure 2:
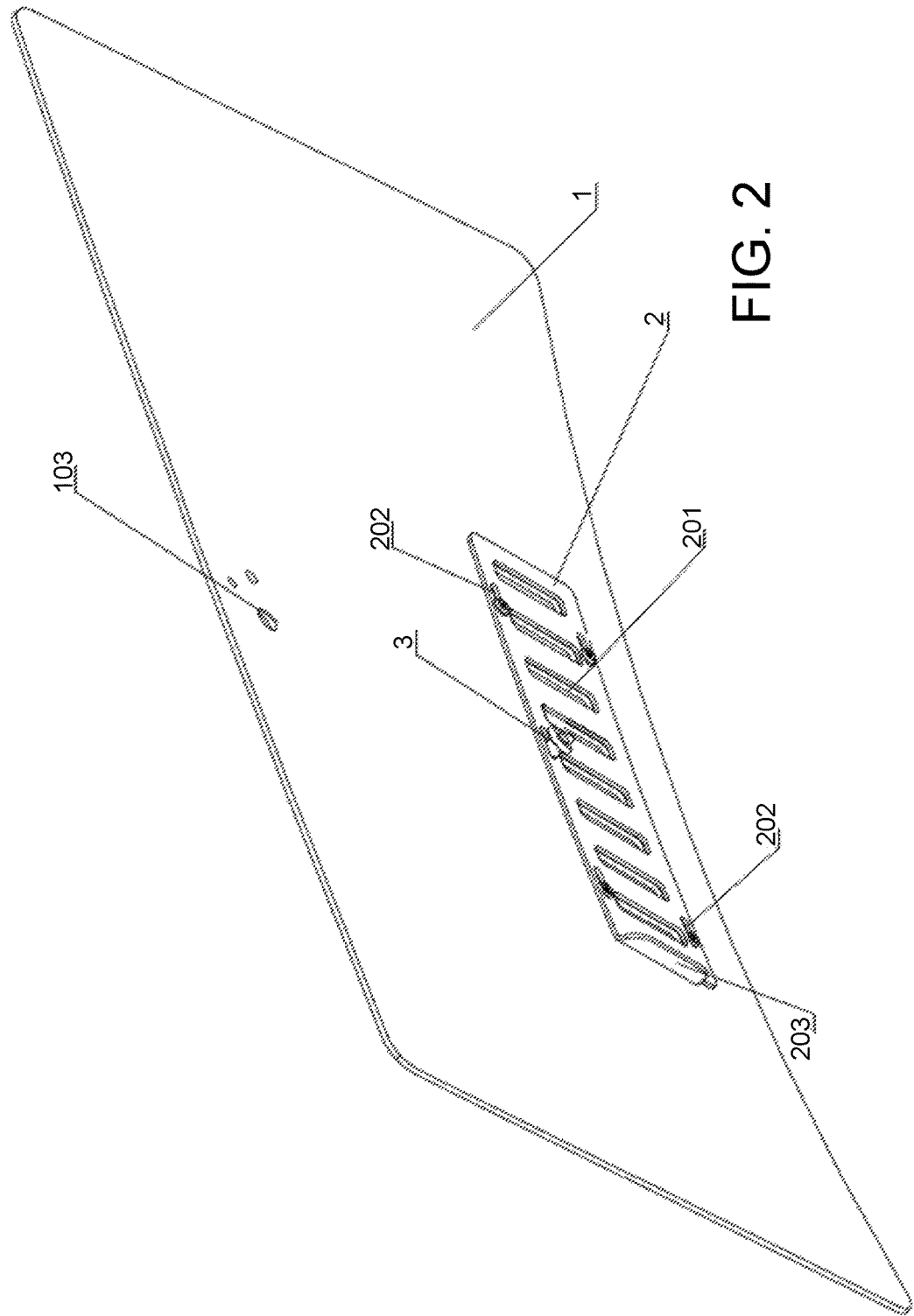
FIG. 2 is an assembled perspective view of the windshield of FIG. 1.
Figure 3:
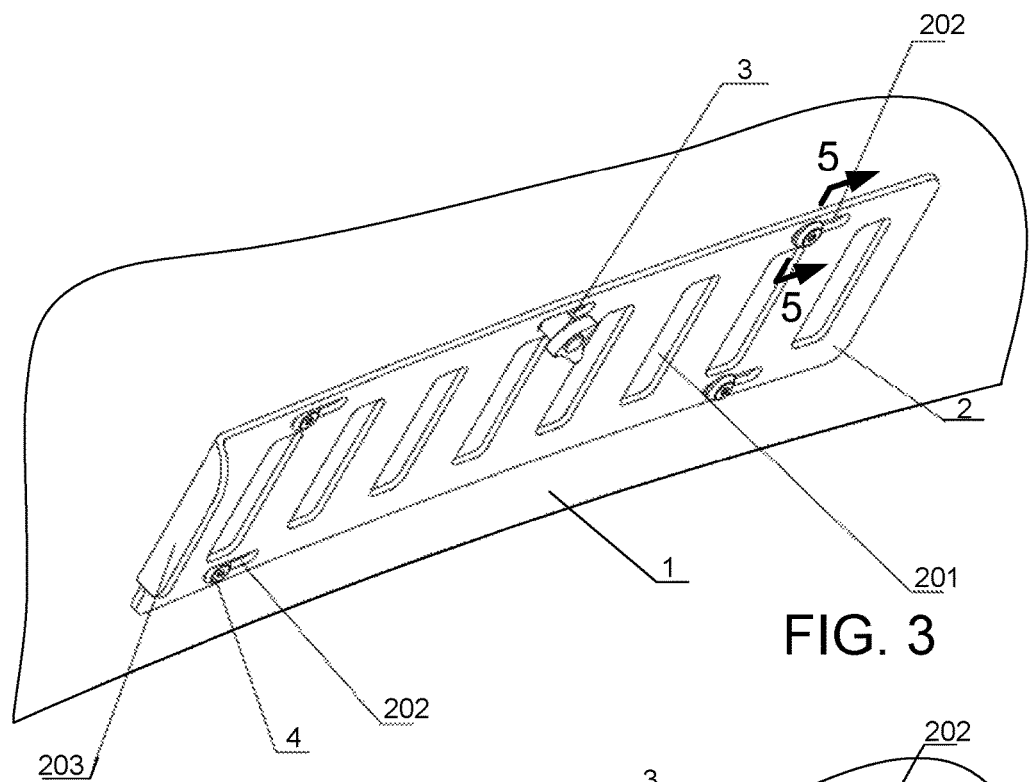
FIG. 3 is an enlargement of a portion of FIG. 2, showing the windshield vent in the closed state.
Figure 4:
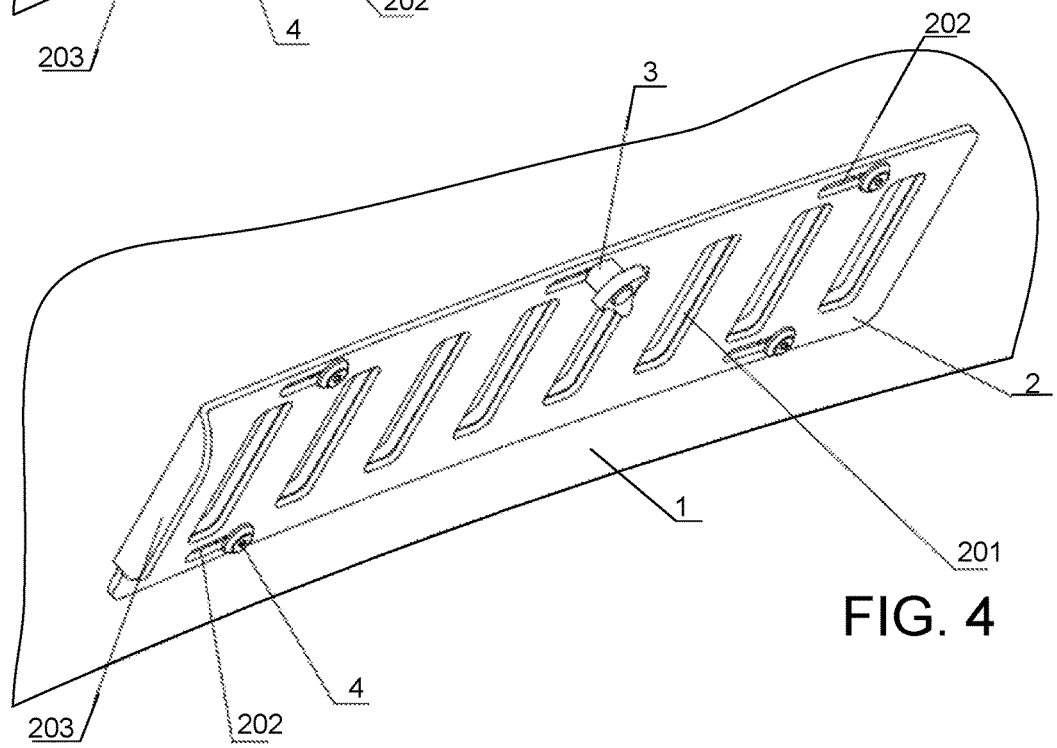
FIG. 4 is a similar enlargement of a portion of FIG. 2, showing the windshield vent in the opened state.

In these Figures, reference numerals are as follows:
1 indicates the transparent body of the windshield;
101 indicates fastener openings through the windshield;
102 indicates ventilation slits through the windshield;
103 indicates accessory holes through the windshield;
2 indicates the slide plate;
201 indicates ventilation slits through the slide plate;
202 indicates the slide slots through the slide plate;
203 indicates the handle;
3 indicates the slide plate lock;
4 indicates fasteners
401 indicates female threaded bolt heads;
402 indicates male threaded bolts;
403 indicates the slide washers; and
5 indicates a washer.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

FIG. 1 shows the transparent (or significantly translucent, if tinted) body portion of a windshield 1, intended for use on a utility vehicle or an all terrain vehicle such as shown in U.S. Pat. Nos. D701,469, D622,631 and 9,365,094, all incorporated by reference. While they could possibly be outfitted with a heating system for the vehicle occupants, such utility and all terrain vehicles do not include an air conditioning system or other source of forced cool air ventilation. In the preferred embodiment, the windshield 1 shown is for a vehicle with spaces for two front seat occupants, a driver and a passenger.

The windshield 1 may include holes 103 in the center near the top of the windshield 1 for various accessories, such as for a rearview mirror (not shown) and/or a windshield wiper (not shown). These holes 103 should be positioned so the accessories minimally obstruct the driver's view, and in particular do not interfere with the driver's view forward down the road or trail.

The windshield 1 is formed of a sheet of transparent material, which is sufficiently robust to protect the vehicle occupants without shattering. For instance, the windshield 1 could be formed of laminated safety glass or tempered glass. More preferably, the windshield 1 is cast or extruded of a polymer material, such as polycarbonate or acrylic (PMMA). In the most preferred embodiment, the windshield 1 is formed of polycarbonate at a uniform thickness of about 5 mm, slightly curved to have the general profile shown. While the curvature of the windshield 1 helps the windshield 1 better withstand wind and impact somewhat, the preferred windshield material is hardened to make it more resistant to crushing or impact.

Unlike prior art windshields, the windshield 1 of the present invention has openings or slits 102 which enable some air to flow through the windshield 1 Like the accessory holes 103, the slits 102 should be positioned so as to minimally obstruct the driver's view, and in particular to not interfere with the driver's view forward down the road or trail. A preferred position for the slits 102 is low in the center of the windshield 1, where the slits 102 will be directly impacted by air flow along the centerline of the vehicle as the vehicle travels. The ventilation slits 102 are more effective in the center of the windward surface. Locating the slits 102 in the center of the vehicle also generates a general ventilation effect to the vehicle cabin without focusing the airflow directly at either the driver or the passenger, neither of which is seated directly behind the slits 102. The middle of the windshield 1 is also an area of the windshield 1 that typically has a generally uniform curvature, important for mating well with the slide plate 2.

Each slit 102 is preferably wider than the thickness of the windshield material, and more preferably at least twice the thickness of the windshield material, thereby presenting a significantly open air flow profile through the slits 102 even when driving in a crosswind. At the same time, each slit 102 is narrow enough to still provide a significant safety function in preventing branches or airbourn stones from entering the vehicle. In the preferred embodiment, the slits 102 are 25 mm wide in the 5 mm thick windshield material.

The spacing between slits 102 needs to be great enough, for the length of slits chosen, so as to not create too weak of a windshield section between adjacent slits 102 to adequately protect the vehicle occupants. The spacing between slits 102 also affects the maximum amount of open space for ventilation. In the preferred embodiment, the spacing between slits 102 matches the slit width at 25 mm.

The length of the slits 102 is chosen to complete the general area desired for ventilation. In the preferred embodiment, this ventilation area is about 100 mm high×375 mm wide, taking up in the width direction slightly less than the middle third of the windshield 1. With slits 102 that are 25 mm wide and at 25 mm spacing, this means the preferred embodiment uses eight slits 102. To provide an adequate ventilation effect, the slits 102 combine for an open area of at least 15 cm$^2$, and more preferably an open area of at least 100 cm$^2$. In the preferred embodiment, the eight slits 102 combine for an open area of about 200 cm$^2$.

The orientation of the slits 102 is chosen for the easiest formation, attachment and movement of the slide plate 2. In the preferred embodiment, particularly useful when the ventilation area is wider than it is high, the slits 102 are oriented vertically (i.e., vertically relative to the windshield 1, at whatever pitch angle the windshield 1 has). With vertically oriented slits 102, the sliding movement of the slide plate 2 is horizontal. Alternatively, horizontally oriented slits can be used, with the sliding movement of the slide plate being vertical.

In manufacture of the windshield 1, the slits 102 are formed in the sheet material before the windshield hardening treatment. The end of each slit 102 has a circular transition or rounded corners, so as to provide no sharp edges.

As shown in FIGS. 1-4, the slide plate 2 is attached to the windshield 1 immediately behind the slits 102. The slide plate 2 should include slits 201 which match in number, width, length, spacing and orientation to the slits 102 in the windshield 1. Accordingly, in the preferred embodiment, the slide plate 2 includes eight slits 201, each 25 mm wide and 100 mm high, oriented vertically and spaced 25 mm apart. Like the slits 102 in the windshield 1, the ends of each slit 201 in the slide plate 2 have a circular transition or rounded corners, so as to provide no sharp edges. In some embodiments, the slide plate 2 has a slight curvature both in width and height directions which matches the slight uniform curvature of the inside of the windshield 1. Alternatively, the slide plate 2 may be planar, provided the attachment between the slide plate 2 and the windshield 1 still permits sliding.

The slide plate 2 is attached to the windshield 1 in a manner that allows it to move relative to the windshield 1, with the preferred travel length matching the width of the slits 102, 201. Thus, in the preferred embodiment, the slide plate 2 is attached to the windshield 1 such that it can be slid horizontally a distance of about 25 mm. In the preferred embodiment, this is achieved through five fastener openings 101 through the windshield 1, four for slide pegs or bolts 4 and one for a slide lock 3. The five fastener openings 101 are preferably positioned adjacent to but just outside the ventilation area defined collectively by the slits 102.

Figure 5:
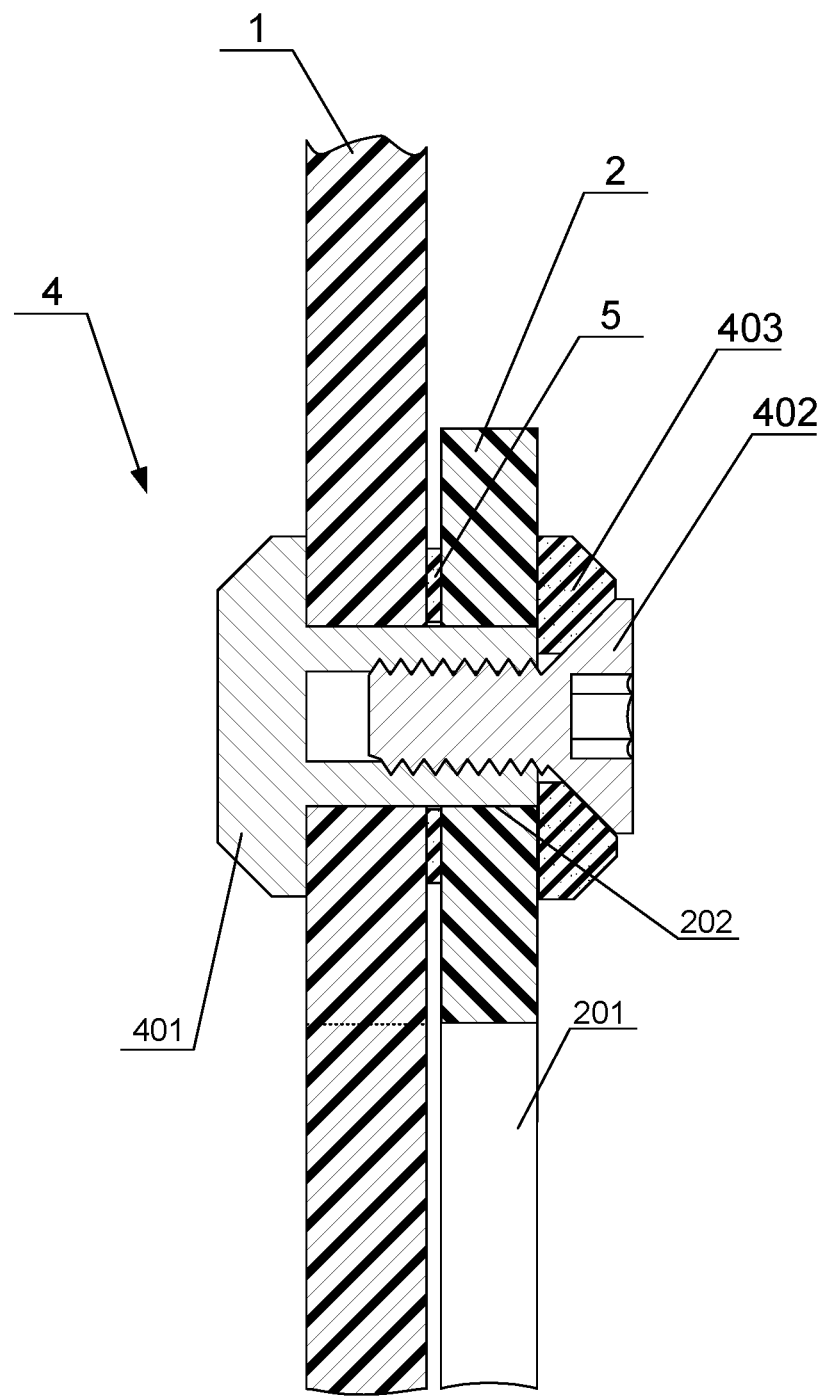
FIG. 5 is a cross-sectional view through the windshield vent, showing attachment of the slide plate to the windshield.

Each fastener opening 101 in the windshield 1 is circular. While it might be possible to directly machine threads into the fastener openings, a more robust connection is provided by inserting female threaded bolt heads 401 (such as best shown in FIG. 5) into each of the five fastener openings 101. The female threaded bolt heads 401 are preferably formed of stainless steel. The four bolt heads 401 used for slide pegs may include a nylon locking nut insert (not shown) in their threads as known in the fastening arts. The diameter of the fastener openings 101 and the diameter of the bolt heads 401 are selected as appropriate to handle the associated stresses for years of repeated use, such as 7.5 mm diameter fastener openings 101 receiving 15 mm bolt heads 401 with 7.5 mm shanks.

The shanks of the female threaded bolt heads 401 extend through the circular openings 101 in the windshield 1 and into five appropriately positioned slide slots 202 in the slide plate 2. Each of the slide slots 202 has a width which generally matches the diameter of the shanks (7.5 mm, in the preferred example) of the bolt heads 401. Each of the slide slots 202 has a length in the slide direction to generally match the desired throw of the slide plate 2 (32.5 mm length, allowing for a 25 mm throw, in the preferred example).

The slide plate 2 is preferably formed of a transparent material, preferably of the same transparent material as the windshield 1 so the refractive index of both structures is similar for better viewing through the slide plate 2. Thus, in the preferred embodiment, the slide plate 2 is formed of polycarbonate. However, the slide plate 2 itself provides no significant safety role, but instead merely allows the occupants to open or close the ventilation openings. Playing no significant safety role, the slide plate material need not be as thick as the windshield material, and need not be hardened in the same way. Thus, the slide plate 2 is preferably thinner than the windshield 1, with the preferred embodiment having a slide plate 2 which is 4 mm thick.

The slide plate 2 includes a handle 203 for easier grasping by an occupant when sliding the slide plate 2 between the open and closed positions. In the preferred embodiment with a horizontal throw, the handle 203 is provided by inwardly curving a vertical edge of the slide plate material. This edge preferably extends inward a distance acceptable for grasping but small enough to be inconspicuous, such as about 15-20 mm.

When using a planar slide plate 2, when the curvature of the inside of the windshield 1 is not uniform, or to eliminate production error and assembling clearance, an intermediate spacer structure may be positioned between the slide plate 2 and the windshield 1. In one preferred embodiment as shown in FIG. 5, thin washers 5 are placed around the shanks of the five female threaded bolt heads 401 between the slide plate 2 and the windshield 1. While the washers 5 can be formed of any hard material (such as, at low cost and readily available steel washers), they are preferably formed of a transparent material such as polycarbonate or more preferably acrylic (PMMA). In a preferred embodiment, the washers 5 are circular at a thickness of about 0.8 mm, with an inner diameter of about 10 mm and an outer diameter of about 18 mm. Such washers minimize any wear between the slide plate 2 and the windshield 1, because during sliding the slide plate 2 only bears against the surface of the washers 5. At the same time, the washers 5 introduce a gap between the slide plate 2 and the windshield 1. When the slide plate 2 is positioned in a closed position with the slide plate slits 201 staggered relative to the windshield slits 102, there is still a slight gap (about 0.8 mm) through which air or water can flow laterally between the windshield 1 and the slide plate 2. With most ATV usages, the small permitted water egress between the windshield 1 and the slide plate 2 (such as when driving in rain) is acceptable relative to the benefit of a slight air flow and drying allowed by the gap between the slide plate 2 and the windshield 1.

As an alternative to washer 5, a thin seal strip (not shown) can be positioned between the windshield 1 and the slide plate 2. For instance, the seal strip can encircle each of the five fastener openings 101 and each of the eight slits on the windshield 1, providing a lubricious bearing surface for the slide plate 2. The seal strip 5 not only assists in allowing sliding of the slide plate 2 relative to the windshield 1, but also helps keep rain or other water from passing between the windshield 1 and the slide plate 2, particularly important when the slide plate 2 is in the closed position shown in FIG. 3. For instance, the seal strip 5 may be formed of a silicone material (coated to reduce friction), polytetrafluoroethylene (PTFE) or fluorinated ethylene proplylene (FEP).

The slide plate 2 is slidably secured to the windshield 1, preferably by four tool tightenable male threaded bolts 402 (as shown in FIG. 5) and one hand tightenable male threaded locking bolt 3 (best shown in FIGS. 1-4). Each of the tool tightenable bolts 402 and the hand tightenable locking bolt 3 may be formed of stainless steel. For instance, the four tool tightenable male threaded bolts 402 preferably include an Allen wrench recess or similar recess for tightening with a screw driver. A slide washer 403 is used on each of these tool-tightenable male threaded bolts 402, so the slide plate 2 is kept sealed against the seal strip 5 but still permits hand sliding using the handle 203. In contrast, the hand tightenable locking bolt 3 preferably includes a shoulder which butts up against the slide plate 2 to provide a friction force between the locking bolt 3 and the slide plate 2, so when tightened the locking bolt 3 prevents the slide plate 2 from sliding from the normal vibrations witnessed during driving the vehicle. Alternatively, the slide plate 2 could be slidably secured to the windshield by adhesively attaching guide members to the windshield, so the only openings through the windshield are provided by the slits 102.

Each of the four tool tightenable bolts 402 and the locking bolt 3 are preferably removable by the user such as by using standard tools, which enables the slide plate 2 to be easily removed from the windshield 1. Removal of the slide plate 2 from the windshield 1 is beneficial not only when replacing the slide plate 2 such as when damaged, but also for standard maintenance and cleaning.

Operation of the vented windshield is simple and straightforward. When the slits 201 in the slide plate 2 are staggered from the slits 102 in the windshield 1, the vent is closed, substantially restricting (in the embodiment with the washers 5) or entirely preventing (in the embodiment with a seal strip) air flow through the windshield 1. When the slide plate 2 is slid so the slits 201 in the slide plate 2 align with the slits 102 in the windshield 1, the vent is opened. Only a small amount of movement of the slide plate 2 is needed to open or close the vent. The user merely hand loosens the locking bolt 3, slides the slide plate 2 to the desired position, and retightens the locking bolt 3. While the vented windshield is in the open position in an enclosed cab, air can move linearly through the windshield and a corresponding temperature adjustment in the cab can be realized. While the vented windshield device is in the open position in an open cab, the air flow entering into through the windshield changes the air flow direction in the cab, minimizing the entry of dust raised on the sides of the vehicle from entering and settling in the cab, thereby improving the driving environment. Of course, the user can also move the slide plate 2 to an in-between position so the vent is partially opened and partially closed.

Although the present invention has been described with reference to preferred embodiments, workers skilled in the art will recognize that changes may be made in form and detail without departing from the spirit and scope of the invention.

The invention claimed is:

1. A vented windshield for a utility or off-road all terrain vehicle, comprising:
   a windshield body which is transparent or translucent;
   a plurality of slits defined through the windshield body;
   a slide plate slidably attached to the windshield body, the slide plate having a plurality of slits defined therethrough that correspond to the slits defined through the windshield body, the slide plate being moveable between a closed position wherein the slide plate slits are staggered relative to the windshield slits and an opened position wherein the slide plate slits are aligned relative to the windshield slits, wherein in the closed position the slide plate restricts or prevents air from flowing through the windshield slits and in the opened position the slide plate allows air flow linearly through the windshield slits.

2. The vented windshield of claim 1, wherein the slide plate comprises a handle for hand sliding of the slide plate.

3. The vented windshield of claim 2, wherein the slide plate is formed of a sheet of transparent or translucent material, and wherein the handle is formed as a curved section of the sheet of transparent or translucent material along a vertical side of the slide plate.

4. The vented windshield of claim 1, further comprising a locking bolt which is hand tightenable for preventing the slide plate from sliding relative to the windshield body.

5. The vented windshield of claim 1, further comprising a spacer positioned between the slide plate and the windshield body.

6. The vented windshield of claim 1, wherein the slide plate includes a plurality of slide slots, and further comprising slide pegs fixed to the windshield and extending through the slide slots.

7. The vented windshield of claim 1, wherein the slide pegs are provided by fasteners which are tool tightenable extending through the slide slots.

8. The vented windshield of claim 1, wherein the windshield body comprises a plurality of fastener holes positioned adjacent the plurality of slits in the windshield body, and comprising fasteners extending through the fastener holes to slidably secure the slide plate to the windshield body.

9. The vented windshield of claim 1, wherein the slide plate is formed of the same material as the windshield body.

10. The vented windshield of claim 9, wherein the windshield body and the slide plate are each formed of a sheet of transparent or translucent material, and wherein the slide plate has a thickness which is less than a thickness of the windshield body.

11. The vented windshield of claim 9, wherein the windshield body is hardened and the slide plate is not hardened.

12. The vented windshield of claim 1, wherein each of the slits has a width which is greater than a thickness of the windshield body, and wherein a throw of the slide plate is at least as long as the width of the slits.

13. The vented windshield of claim 1, wherein the slits through the windshield are collectively define a ventilation area which is wider than it is tall, and wherein the ventilation area is centered in the windshield body and positioned along a bottom of the windshield body.

14. The vented windshield of claim 1, wherein the slits are in a center of a windward surface of the windshield body, so as to not focus airflow directly at either a driver or a passenger.

15. The vented windshield of claim 1, wherein the slits combine for an open area of at least 15 cm$^2$.

16. The vented windshield of claim 1, wherein the slits are oriented vertically, and wherein a throw of the slide plate is horizontal.

17. A vented windshield for a utility or off-road all terrain vehicle, comprising:
    a windshield body which is formed of a sheet of transparent or translucent material, the windshield body having a windshield body thickness;
    at least one ventilation opening defined through the windshield body, the at least one ventilation opening providing a ventilation area that is centered in the windshield body and positioned along a bottom of the windshield body so as to not focus airflow directly at either a driver or a passenger;
    a slide plate slidably attached to the windshield body, the slide plate being formed of a sheet of transparent or translucent material, the slide plate being moveable between a closed position wherein the slide plate restricts or prevents air from flowing through the ventilation opening and an opened position wherein the slide plate allows air flow linearly through the ventilation opening.

18. The vented windshield of claim 17, wherein the slide plate comprises a handle for hand sliding of the slide plate, wherein the slide plate is formed of a sheet of transparent or translucent material, and wherein the handle is formed as a curved section of the sheet of transparent or translucent material along a vertical side of the slide plate.

19. The vented windshield of claim 17, wherein the slide plate is formed of the same material as the windshield body, wherein the windshield body is hardened and the slide plate is not hardened, and wherein the slide plate has a thickness which is less than a thickness of the windshield body.

20. A method of forming a vented windshield for a utility or off-road all terrain vehicle, comprising:
    forming a windshield body out of a sheet of transparent or translucent material, the windshield body having a windshield body thickness;
    opening a plurality of slits through the windshield body and a plurality of fastener openings through the windshield body;
    hardening the windshield body;
    forming a slide plate out of a sheet of the same transparent or translucent material as the windshield body, the slide plate having a slide plate thickness which is less than the windshield body thickness, the slide plate having a plurality of slits defined therethrough that correspond to the slits defined through the windshield body; and
    using the plurality of fastener openings to slidably attach the slide plate to the windshield body, the slide plate being moveable between a closed position wherein the slide plate slits are staggered relative to the windshield slits and an opened position wherein the slide plate slits are aligned relative to the windshield slits, wherein in the closed position the slide plate restricts or prevents air from flowing through the windshield slits and in the opened position the slide plate allows air flow linearly through the windshield slits.

* * * * *